April 10, 1962  K. A. ANDERSON ETAL  3,028,968
FILTER APPARATUS
Filed Oct. 30, 1958  2 Sheets-Sheet 1

INVENTORS
KENNETH A. ANDERSON
CHARLES E. DE PAEPE
BY
ATTORNEYS

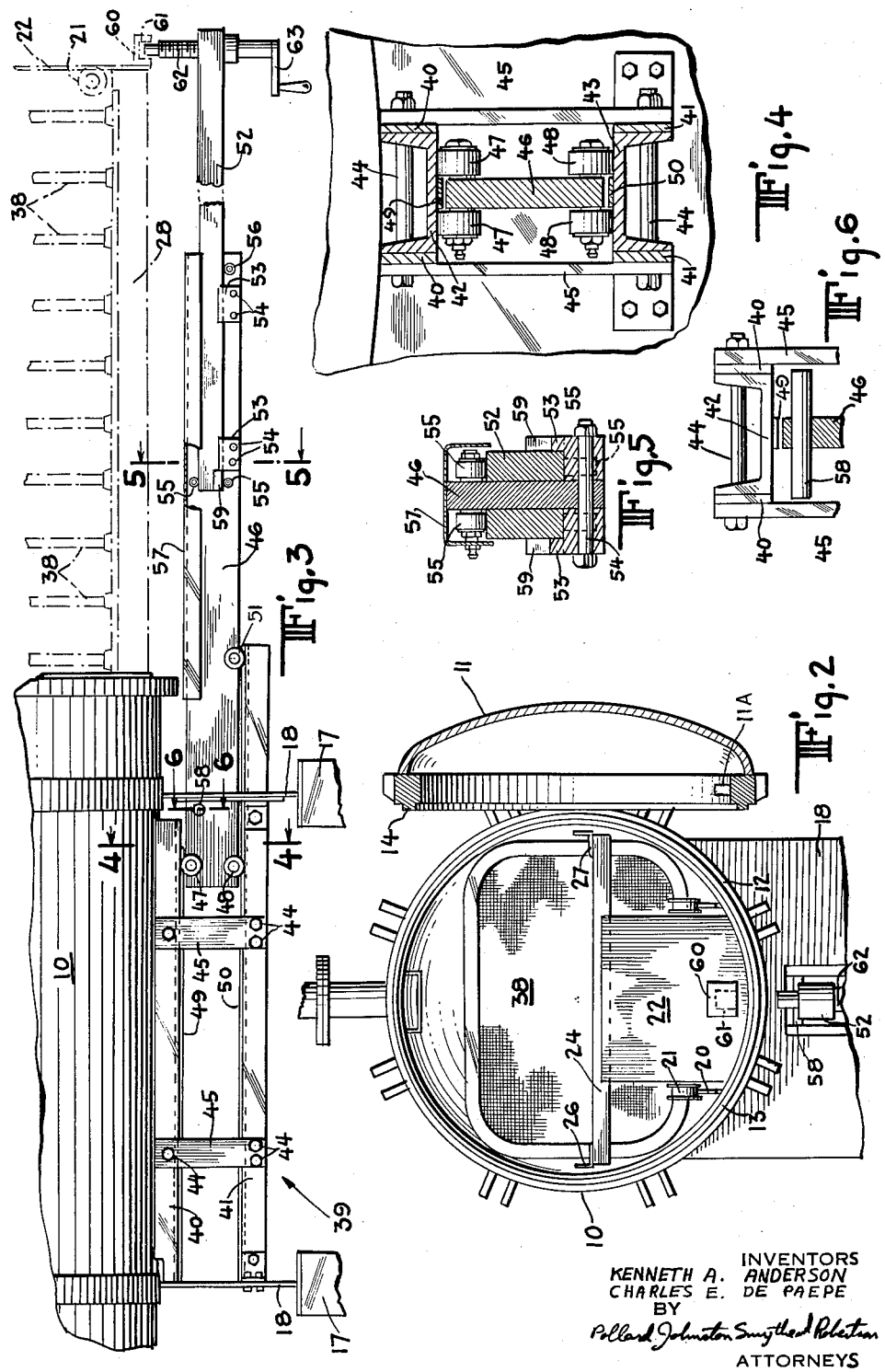

United States Patent Office 3,028,968
Patented Apr. 10, 1962

3,028,968
FILTER APPARATUS
Kenneth A. Anderson, Silvis, and Charles E. De Paepe, Geneseo, Ill., assignors to Ametek, Inc., a corporation of Delaware
Filed Oct. 30, 1958, Ser. No. 770,865
5 Claims. (Cl. 210—236)

This invention relates to filter apparatus and particularly to a construction which permits the ready removal of the entire assembly of filter elements from the pressure tank when the pressure tank door is opened.

Many constructions have been devised for permitting such removal such as fixed overhead tracks and track constructions which must be assembled and disassembled each time the filter elements are to be removed. The fixed track arrangements take up too much space, thereby interfering with operations around the filter apparatus when it is in use, while the constructions which require complete assembly and disassembly of the track construction naturally consume too much time. Applicant's new construction eliminates both of these problems and results in a filter apparatus which occupies a minimum amount of space when in operation while permitting the ready removal of the entire assembly of filter elements as a unit from the pressure tank when the door thereof is open.

It is a object of this invention to provide a filter apparatus having an assembly of filter elements slidably mounted in a pressure tank and means operative only when the tank door is open for sliding the assembly out of the tank.

It is another object of this invention to provide a filter apparatus in which the assembly of filter units can be readily moved out of the pressure tank without any fixed outwardly extending tracks or any tracks which must be assembled and disassembled.

It is another object of this invention to provide a telescoping track construction which can be removably interlocked to the assembly of filter elements for sliding movement thereof out of the pressure tank only when the closure member for the pressure tank is open.

The filter apparatus of the invention includes a pressure tank having an open end which is adapted to be closed by a closure member. An assembly of filter elements is slidably mounted in the tank for movement as a unit through the open end of the tank. Below the tank is a telescoping slide means which is adapted to be connected to the assembly by interlocking means when the closure member is in open position. Thus, when the slide means is moved outwardly the assembly is also moved outwardly and is supported at its free end by the interlocking means and the slide means.

These and other objects, advantages and features of the invention will become apparent from the following detailed description and drawings, which are merely exemplary.

FIG. 2 is an end view of the apparatus of FIG. 1 taken along the line 2—2 of FIG. 1 looking in the direction of the arrows, with the closure member being shown in open position;

FIG. 3 is an enlarged side elevational view of the telescoping slide construction of the invention;

FIG. 4 is a cross-sectional view taken along the line 4—4 of FIG. 3 looking in the direction of the arrows;

FIG. 5 is a cross-sectional view taken along the line 5—5 of FIG. 3 looking in the direction of the arrows; and FIG. 6 is a cross-sectional view taken along the line 6—6 of FIG. 3 looking in the direction of the arrows.

Figure 1:
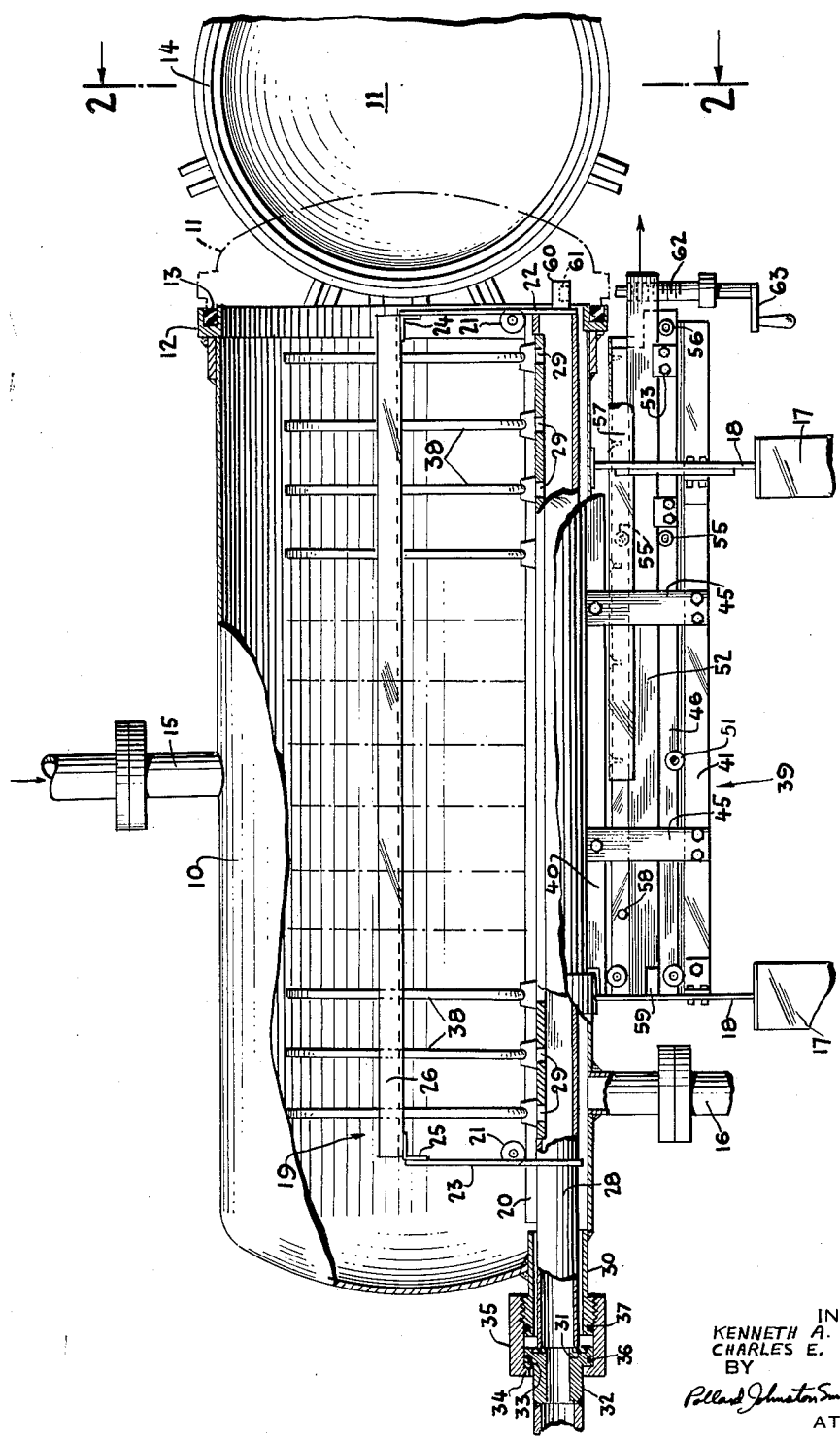
FIG. 1 is a side elevational view of a filter apparatus embodying my invention, with parts broken away and with other parts shown in cross-section.

As seen in FIG. 1, the filter apparatus includes a pressure tank 10 open at one end and adapted to be closed by a hinged cup-shaped cover or closure member 11. In order to prevent leakage and maintain the desired pressure in the tank when closure member 11 is in closed position, the open end of tank 10 has an annular U-shaped ring 12 secured thereto which supports an annular flexible sealing member 13. Closure member 11 has an inwardly extending annular flange 14 which is forced against flexible sealing member 13 when the closure member is locked, by any suitable means, in closed position, shown in dotted lines in FIG. 1.

Tank 10 is provided with an inlet 15 through which the fluid to be filtered is introduced into the interior of the tank and an outlet 16 for draining the fluid from the inside of the tank. The tank is supported above the floor by legs or supports 17, only two of which are shown, connected to plates 18 secured to the tank.

The filter assembly 19 is slidably mounted within tank 10 on tracks 20 upon which flanged wheels 21, which are rotatably secured to assembly 19, travel. Assembly 19 includes a frame having a front plate 22, a back plate 23, front and back cross-bars 24 and 25, respectively, secured to their respective plates, and side bars 26 and 27, each of which is connected adjacent its ends to bars 24 and 25. Front and rear plates 22 and 23 are secured near their bottom to conduit 28 having openings 29 through which fluid can flow into the conduit.

The rear end of conduit 28 passes through pipe 30 which extends to the exterior of tank 10, and engages an annular sealing ring 31 in the end of outlet pipe 32 through which the filtered fluid flows. The end of pipe 32 has an annular flange 33 which is engaged by inwardly directed flange 34 on coupling nut 35. Nut 35 is internally threaded at its other end to engage the external threading on pipe 30 so that outlet pipe 32 can be moved toward conduit 28 to ensure sealing engagement between the conduit and ring 31. In order to further prevent leakage in the coupling, O-rings 36 and 37 may be provided. The coupling construction disclosed permits the removal of conduit 28 when the filter assembly moves out of tank 10 while ensuring proper sealing when the filter assembly is in operative position in the tank.

Coupled to conduit 28 are a plurality of vertical, parallel filter elements 38 which are positioned so as to overlie openings 29, thereby ensuring that all fluid entering conduit 28 passes through filter elements 38. Side bars 26 and 27 serve to hold the filter elements 38 in position relative to conduit 28.

With the construction described it is clear that the entire filter assembly including the frame, conduit 28 and filter elements 38 is slidably mounted in tank 10 and can be moved out of the same on tracks 20 as a unit. However, when the front end of the assembly which is supported on tracks 20 by rollers 21 is moved to a position where rollers 21 are no longer on tracks 20, the front end of the assembly will sag since it is unsupported. In order to support the front end of the filter assembly when it is moved out of tank 10, a novel telescoping support structure, shown generally as 39, is provided.

Support structure 39 includes a pair of spaced, parallel upper support bars 40 secured to plates 18 and a pair of spaced, parallel lower support bars 41 also secured to plates 18. Between upper bars 40 is a U-shaped upper track member 42 while between lower bars 41 is a U-shaped lower track member 43. Track members 42 and 43 are held in position and upper and lower bars 40 and 41 are held in spaced relation by bolts 44 passing through openings in the legs of the track member, the support bars, and parallel, vertical spacing bars 45.

The telescoping portion of support structure 39 includes a first slide 46 having a pair of spaced upper rollers 47 and a pair of spaced lower rollers 48 adjacent its rear end. A portion of each of rollers 47 and 48 extends beyond the top and bottom, respectively, of slide 46 so that they engage the flat surfaces of upper and lower track members 42 and 43. In order to prevent lateral movement of slide 46, upper and lower guide strips 49 and 50 are secured to track members 42 and 43, respectively, in a position between the spaced rollers. A pair of parallel, spaced front lower rollers 51 are rotatably mounted in slide 46 so as to ride on lower track member 43 and support the front portion of slide 46 thereon.

A second slide 52 is bifurcated with parallel legs on either side of first slide 46 and is held against lateral movement relative to the first slide by guide members 53 secured to the first slide, as by bolts 54. Rotatably mounted on first slide 46 are upper and lower rear support rollers 55 and lower front support roller 56 which slidably support second slide 52 for longitudinal movement relative to first slide 46. A guard 57 may be secured to first slide 46 to protect rollers 55 and the telescoping slide structure.

Stop 58 prevents excessive outward movement of first slide 46 relative to its supporting structure while stop 59 prevents excessive outward movement of second slide 52 relative to first slide 46. As can be seen in FIGS. 2 and 6, stop 58 is dimensioned laterally so that it passes between spacing bars 45 but does not pass through the opening in front plate 18, so that it engages the front plate to prevent excessive outward movement of first slide 46.

It is evident from the above description that the telescoping support structure 39 may be easily extended from its telescoped, FIG. 1, position to its extended, FIG. 3, position.

Since closure member 11 must be tightly closed when the filter apparatus is in operating condition and since telescoping supporting structure 39 is outside of tank 10 while filter assembly 19 is inside of the tank, it is necessary to provide some means for selectively interlocking support structure 39 and filter assembly 19 when the filter assembly is to be moved from the interior of the tank. In the form shown in the drawings this includes an extension piece 60 secured to the front of plate 22 and having a downwardly opening bore 61 therein. Extension piece 60 is positioned so that it does not interfere with the closing of cover 11. Threadingly engaged in a bore in the front end of second slide 52 is a screw member 62 having a crank handle 63 secured to its lower end. Thus, in order to interlock supporting structure 39 and filter assembly 19 for conjoint outward movement when closure member 11 is in open position, it is merely necessary to turn handle 63 to move screw member 62 upwardly until its end enters bore 61 in extension piece 60. The filter assembly may then be moved outwardly by hand, or by a winch or other suitable mechanical means, while its front end is continuously supported in all positions by support structure 39.

In order to position the assembly when the cover is closed lugs 11A may be placed on the cover for engagement with plate 22 to force the assembly to the left (FIG. 1). It is preferable before opening the filter to unloosen turn coupling nut 35. Then when the cover is again closed, if the cover gasket 13 is compressed more than the previous time, the manifold 28 can take its proper position to the left without damage to gasket 31.

It should be apparent from the above, that the telescoping support structure provides a compact arrangement for moving the filter assembly from the interior of the tank with a minimum of time and effort. Details of construction, of course, can be varied without departing from the spirit of the invention except as defined in the appended claims.

What is claimed is:

1. In a filter apparatus, the combination comprising a pressure tank having an open front end, track means on the bottom of and inside of said tank, support means slidably mounted on said track means for movement into and out of said tank through said open end, a plurality of spaced, vertically disposed filter elements on said support means, a closure member for said open end, longitudinally extending guide means below and outside of said tank, telescoping slide bar means slidably mounted on said guide means, and detachable load supporting means comprising parts attached to said slide bar means and to said support means, whereby in one position of said parts, the load of the front end of the support means is transmitted to said bar means and in another position of said parts, detachable therefrom out of the way of said closure means, so that when said slide bar means is moved outwardly said support means also moves outwardly and is supported at its free end by said load supporting means and said slide bar means, thereby permitting the easy cleaning and replacement of the filter elements.

2. In a filter apparatus, the combination comprising a pressure tank having an open front end, track means on the bottom of and inside of said tank, support means having rollers thereon which are adapted to travel on said track means for movement into and out of said tank through said open end, a plurality of spaced, vertically disposed filter elements on said support means, a closure member for said open end, longitudinally extending guide means below and outside of said tank, telescoping slide bar means slidably mounted on said guide means, and detachable load supporting means comprising parts attached to said slide bar means and to said support means, whereby in one position of said parts, the load of the front end of the support means is transmitted to said bar means and in another position of said parts, detachable therefrom out of the way of said closure means, so that when said slide bar means is moved outwardly said support means also moves outwardly and is supported at its free end by said load supporting means and said slide bar means, thereby permitting the easy cleaning and replacement of the filter elements.

3. In a filter apparatus, the combination comprising a pressure tank having an open front end, and an assembly of filter elements slidably mounted in said tank for movement as a unit into and out of said tank through said open end, a closure member for said open end, an upper guide track secured to the bottom outside surface of said tank, a lower guide track vertically spaced from and parallel to said upper guide track, a first slide comprising two parallel transversely spaced slide bars having upper and lower rollers which are adapted to travel along said upper and lower guide tracks respectively, a second slide slidably mounted in the space between said transversely spaced slide bars, said first and second slides being adapted to be telescoped into said upper and lower guide tracks when in their inoperative position, and detachable load supporting means comprising parts attached to the front end of said second slide and to the front end of said assembly, whereby in one position of said parts, the load of the front end of the assembly is transmitted to said second slide and in another position of said parts, detachable therefrom out of the way of said closure member, so that when said slides are moved outwardly said assembly also moves outwardly and is supported at its front end by said load supporting means and the front end of the second slide.

4. In a filter apparatus, the combination comprising a pressure tank having an open front end, an assembly of filter elements slidably mounted in said tank for movement as a unit into and out of said tank through said open end, a closure member for said open end, an upper guide track secured to the bottom outside surface of said tank, a lower guide track vertically spaced from and parallel to said upper guide track, a first slide comprising two parallel transversely spaced slide bars having upper and lower rollers which are adapted to travel along said upper and lower guide tracks respectively, a second slide slidably mounted in the space between said transversely spaced slide bars, first stop means for limiting the movement of said first slide relative to said upper and lower guide tracks, second stop means for limiting the movement of said second slide relative to said first slide, said first and second slides being adapted to be telescoped into said upper and lower guide tracks when in their inoperative position, and detachable load supporting means comprising parts attached to the front end of said second slide and to the front end of said assembly, whereby in one position of said parts, the load of the front end of the assembly is transmitted to said second slide and in another position of said parts, detachable therefrom out of the way of said closure member, so that when said slides are moved outwardly said assembly also moves outwardly and is supported at its front end by said load supporting means and the front end of the second slide.

5. In a filter apparatus, the combination comprising a pressure tank having an open front end, an assembly of filter elements slidably mounted in said tank for movement as a unit into and out of said tank through said open end, a closure member for said open end, an upper guide track secured to the bottom outside surface of said tank, a lower guide track vertically spaced from and parallel to said upper guide track, a first slide comprising two parallel transversely spaced slide bars having upper and lower rollers which are adapted to travel along said upper and lower guide tracks respectively, a second slide slidably mounted in the space between said transversely spaced slide bars, first stop means for limiting the movement of said first slide relative to said upper and lower guide tracks, second stop means for limiting the movement of said second slide relative to said first slide, said first and second slides being adapted to be telescoped into said upper and lower guide tracks when in their inoperative position, vertical bore means in the front end of said assembly, and vertically movable screw means connected to the front end of said second slide and adapted to enter said bore means when said closure member is in open position to selectively interlock said second slide and said assembly, whereby when said screw means is engaged with said assembly, the load of said assembly will be transmitted to said second slide and when disengaged therefrom, will be out of the way of said closure member, so that when said slides are moved outwardly said assembly also moves outwardly and is supported at its front end by said interlocking means and the front end of the second slide.

References Cited in the file of this patent

UNITED STATES PATENTS

| 2,417,000 | Koenig | Mar. 4, 1947 |
| 2,765,083 | Purmort | Oct. 2, 1956 |
| 2,843,267 | Anderson | July 15, 1958 |
| 2,936,075 | Davis | May 10, 1960 |

FOREIGN PATENTS

| 1,128,777 | France | Aug. 27, 1956 |